Patented Jan. 30, 1945

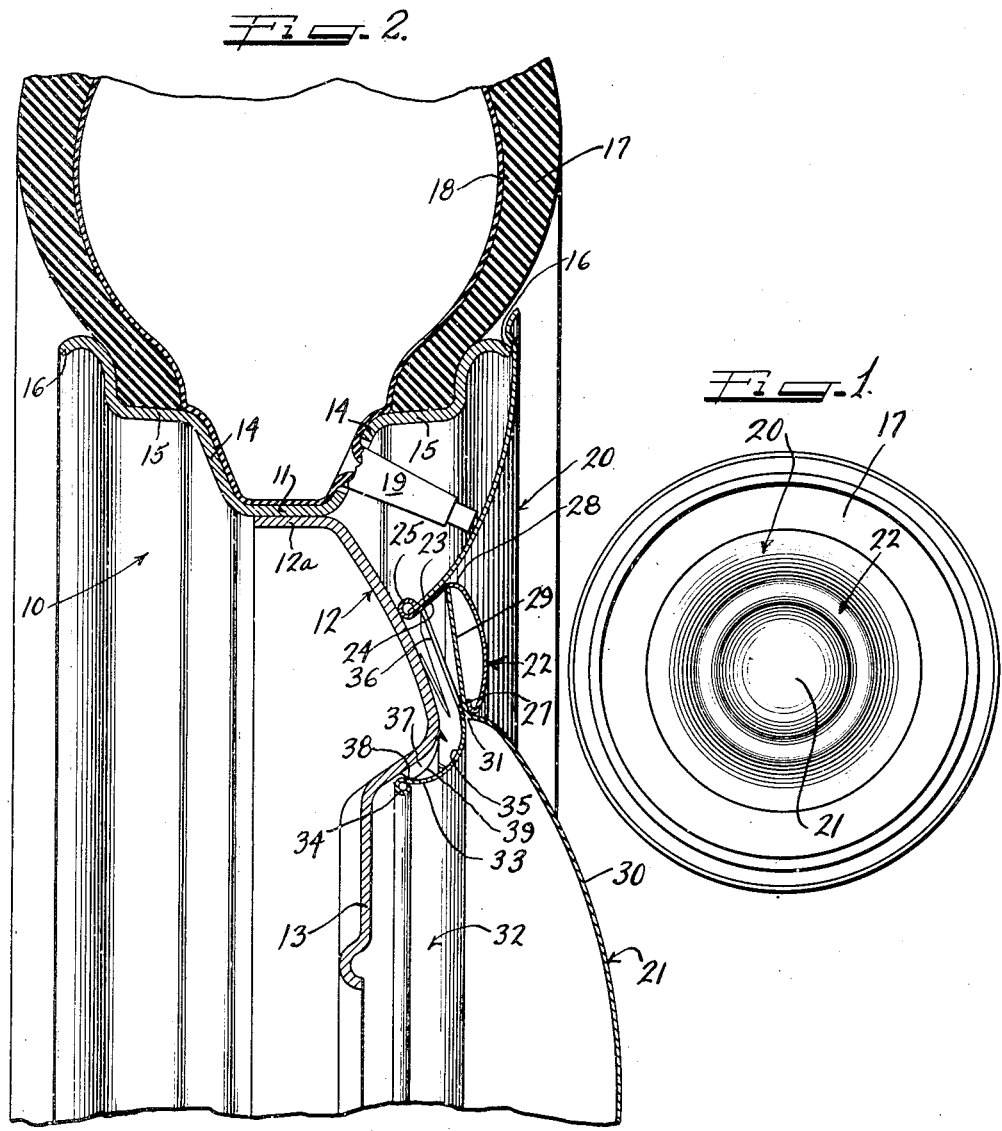

2,368,253

UNITED STATES PATENT OFFICE 2,368,253

WHEEL STRUCTURE

George Albert Lyon, Allenhurst, N. J.

Application December 20, 1943, Serial No. 514,877

7 Claims. (Cl. 301—37)

This invention is directed to an improved wheel structure and relates more particularly to an improved cover assembly therefor.

It is an important object of the present invention to provide for a wheel structure and a novel cover assembly, improved retaining means for detachably maintaining the cover assembly over the outer side of the wheel structure.

It is another important object of the present invention to provide for a cover assembly disposed over the outer side of a wheel structure improved means for maintaining a plurality of cover parts and a retaining annulus together as a unitary structure whereby attachment or detachment of the annulus from the wheel structure results in attachment or detachment of the entire unitary cover assembly therefrom.

It is another important object of the present invention to provide for disposition over a wheel structure including a tire rim of the drop center type and a central load bearing spider, an improved multi-part cover assembly including a radially outer annular portion formed from sheet synthetic plastic material or the like whereby it is self-sustaining as to form and yet may be resiliently, locally, temporarily flexed and will immediately snap back into initial configuration when distorting pressures are relieved therefrom, together with an improved annulus for securing the cover parts together in unitary relationship, said annulus also serving to secure a retaining member on the cover assembly as a unitary part thereof.

It is still another object of the present invention to provide an improved cover assembly including a radially outer annular portion and a central circular hub cap simulating portion, said annular portion having a cross-sectional configuration whereby it extends over the radially outer part of the wheel and generally simulates the curvature of a side wall of a tire in the wheel to give the appearance of being a part thereof, together with a rigidifying, intermediate, annular ornamental member having portions arranged to retainingly receive the radially inner margin of the annular cover member and the radially outer margin of the central circular hub cap member to maintain the same in unitary relationship, said intermediate annular member also being provided with means whereby an independent retaining annulus may be maintained therein as a unitary portion of the cover assembly.

In accordance with the general features of the invention there is provided herein a wheel structure which preferably includes a tire rim of the flanged, drop center type and a central load bearing portion, together with a multi-part, unitary cover assembly including a radially outer annular portion formed from synthetic sheet material and extending radially outwardly to the radially outer extremity of the tire rim and radially inwardly to a point on the wheel radially inwardly of the junction between the tire rim and the central load bearing portion, a central circular hub cap simulating portion and an intermediate rigidifying, reinforcing annular bead member, said bead member having a part arranged to retainingly receive the radially inner marginal part of the annular cover member and having a part arranged to retainingly receive the radially outer margin of the central circular hub cap simulating cover member, there also being an annular retaining member including a snap-on flange arranged for detachable engagement with a portion of the wheel said flange merging into a plurality of radially extending, slightly axially inwardly extending tooth or finger members arranged for retaining engagement with a portion of the intermediate annular bead member of the cover, said retaining member having an intermediate portion arranged to supportingly receive on the axially outer surface thereof the radially inner extremity of said bead member and an intermediate part of said central circular hub cap simulating member.

Many other objects and advantages of the invention will become apparent from the following description and accompanying drawing, in which:

Figure 1 is a side elevational view of a wheel structure embodying a form of my invention; and Figure 2 is a fragmentary, radially cross-sectional view of a wheel structure embodying the form of the invention shown in Figure 1.

It will be understood that the embodiment shown herein is for illustrative purposes only and may be changed or modified without departing from the spirit and scope of the invention as set forth in the appended claims.

In the wheel structure shown herein, there is provided a tire rim 10 having a base flange 11 to which is secured an axially inwardly extending peripheral flange 12a of a central load bearing portion 12. The central load bearing portion is further provided at the radially inner part thereof with a bolt-on flange 13 which, by means of wheel bolts, may be secured to an appropriate part of the vehicle such as the brake drum or the like.

The tire rim 10 is further provided with opposite side wall flanges 14, opposite intermediate flanges 15 and opposite edge portions 16 between which may be disposed a tire 17 having an inner tube 18 provided with a valve stem 19 which is aligned with and extends through a suitable aperture in the adjacent side wall flange 14.

The cover assembly shown herein includes a radially outer annular portion 20 and a central circular hub cap simulating portion 21, there being provided an intermediate annular bead member 22 for rigidifying the cover assembly and further ornamenting the same in a manner to be described presently.

Preferably, the cover member 20 is formed from sheet synthetic plastic material or the like, whereby it may be self-sustaining as to form and yet locally, temporarily, resiliently flexed and whereby it will snap back immediately into initial configuration when distorting pressures are relieved therefrom. Furthermore, it will be seen that the cover member 20 is provided with a cross-sectional shape and expanse whereby it generally simulates the curvature of the side wall of a tire and extends from the edge portion 16 radially inwardly beyond the junction of the tire rim 10 and the central load bearing portion 12 whereby it gives the appearance of being a continuation of the side wall of the tire and of being a part thereof and particularly a white side wall thereof when colored white.

As will be seen from Figure 2 the radially inner margin 23 of the cover member 20 extends generally axially inwardly, radially inwardly into surface engagement with a flange 24 of the intermediate member 22 which is preferably formed from more rigid material such as sheet stainless steel or the like.

The flange 24 furthermore is curled to provide an enveloping bead 25 for the radially inner edge of the cover member 20, whereby the cover 20 and the annular member 22 are securely maintained together as a unitary structure.

The intermediate annular member 22 is further provided with an axially outwardly exposed, axially outwardly convex portion 26 which extends radially inwardly to terminate in a curled circular edge 27, the junction between the portion 26 and the flange 24 comprising a curved part 28 which presents a radially inwardly opening groove for receiving the radially outer edge of a flange 29 that comprises the radially outer border of the circular crowned portion 30 of the hub cap simulating cover member 21. From Figure 2 it will be seen that the junction between the crowned portion 30 and the flange 29 of the cover member 21 comprises an axially outwardly stepped circular part 31 which is adapted to receive, in snug engagement, the curled extremity 27 of the intermediate rigidifying ornamenting member 22.

From the foregoing it will be seen that the cover member 20 is securely retained on the intermediate portion 22 while the cover member 21 is likewise securely attached thereto in permanent relationship since the radially outer extremity of the edge of the flange 29 of the cover member 21 prescribes a greater circle than the snap-on bead 25 of the intermediate member 22.

The cover assembly is completed by the provision of a retaining annulus 32 which includes a generally axially inwardly extending snap-on flange 33 provided with a peripheral snap-on bead 34. The flange 33 terminates in a generally radially outwardly curved portion 34 which in turn terminates in generally radially outwardly extending resilient fingers 36. The terminal ends of the fingers 36 prescribe a circle slightly larger than that prescribed by the radially inner extremity of the reinforcing bead 25 of the annular member 22 and thus it will be seen that when the retaining annulus 32 is forced against the above described cover assembly from the axially inner side thereof until the axially inner extremity of the stepped portion 31 of the cover member 21 is abutted thereby, the teeth 36 will be sprung radially inwardly to pass the bead 25 of the member 22 and thereafter will snap radially outwardly into biting engagement with the adjacent portion of the inner surface of the flange 24 of the member 22. With this relationship established, it will be seen that the cover assembly is securely maintained upon the retaining annulus 32 against axial outward movement therefrom, while at the same time the intermediate portion of the annulus 32 serves admirably as an intermediate support for the cover assembly.

From the foregoing it will be seen that the intermediate annulus 22 serves manifold purposes in the present construction. It presents axially outwardly of the wheel structure an intermediate bead or annulus which, if it is formed from stainless steel may be provided with a high surface luster to greatly augment the appearance of the entire structure, it serves to maintain the adjacent cover parts 20 and 21 and the retaining member 32 in unitary relationship, it intermediately reinforces the cover assembly particularly in the light of the fact that the portions 20 and 21 are preferably formed from sheet synthetic plastic material or another frangible substance and, is will be described presently it serves to position the structure upon the wheel.

While many different expedients may be utilized to detachably secure the above described assembly to the wheel structure, there is provided herein at an appropriate part of the outer surface of the central load bearing portion 12 a plurality of circularly aligned, circumferentially spaced protuberances 37, each of which is provided with a generally axially inwardly facing cam surface 38. In attaching the above described cover assembly to the wheel structure, the cover assembly is aligned concentrically with the wheel and then urged axially inwardly so that the snap-on flange 34 of the retaining ring or annulus 32 abuts the outer surface 39 of the protuberances 37. Upon continued axial inward movement the snap-on flange 34 is forced out of round as it rides up the surfaces 39 until it reaches and passes the peaks of the protuberances, whereupon it snaps back into its circular configuration to assume the position shown in Figure 2, wherein it rests tightly against the inner surfaces 38 of the protuberances 37 to retain the cover assembly securely upon the wheel structure. During this attachment operation, it will be seen that the bead 25 of the intermediate member 22 is brought into surface engagement with the adjacent portion of the surface of the central load bearing portion 12, whereby a supporting relationship is established for the intermediate part of the cover.

When the cover assembly is mounted upon the wheel in a manner described above, it will be seen that the tire valve stem 19 is concealed entirely therebehind and inflation of the tire is accomplished by flexing the adjacent portion of the flexible cover member 20 radially outwardly to provide for the insertion of the nozzle of an air hose so that it may be attached to the valve stem 19.

A similar manipulation of the cover member 20 is necessary in order to permit the insertion of a point of a pry-off tool behind the pry-off bead 25 of the intermedaite member 22 whereupon the operator draws the point of the pry-off tool, and thus the adjacent portion of the bead 25, outwardly to withdraw the retaining annulus 32 and particularly the bead 34 axially outwardly over the humps or protuberances 37 to permit complete removal of the cover assembly from the wheel.

Thus it will be seen that there is provided herein an improved cover assembly for disposition over the outer side of a wheel structure in which there is included a multiplicity of cover parts, these parts being maintained together as a unitary structure by the intermediate bead member 22, this bead member also serving to retain the annulus 32 on the cover assembly as a unitary part thereof.

In assembling the parts of the cover as they are shown in Figure 2, it will be seen that before the bead 25 is formed, the radially inner part of the cover member 20 is disposed against the intermediate portion of the flange 24 of the member 22 whereupon, by means of a suitable rolling operation or the like, the bead 25 is formed to envelop the edge of the cover 20 to secure it in the assembly. Thereafter, the cover member 21 may be concentrically aligned on the axially inner side of the bead member 22, whereupon the flange 29 may be forced axially outwardly of the bead 25 with the portion 27 of the bead member 22 being nested tightly in the stepped portion 31 of the cover 21. Thereafter the retaining annulus 32 may be secured in the assembly as described above.

From the foregoing it will be seen that there is provided herein a multi-part cover assembly which is maintained together as a unit, this assembly being readily adapted, in view of the flexibility of the radially outer portion thereof, to adapt itself to wheel constructions of various designs and dimensions.

What I claim is:

1. In a cover structure for a wheel having a tire rim and a central load bearing portion, a cover assembly for an outer annular member formed from synthetic plastic material and having physical characteristics enabling it to be flexed temporarily locally and yet whereby the cover will return back to its original configuration upon release of distorting pressures therefrom, and a central circular hub cap simulating cover member disposed concentrically to said outer, annular member, said annular cover member having a cross-sectional configuration of such curvature and magnitude that it substantially simulates the side wall of a tire in the tire rim and extends radially inwardly from the plane of the outer edge of the tire rim toward the central load bearing portion, retaining means for maintaining said cover members on the wheel, said retaining means including a generally axially inwardly extending retaining portion arranged for detachable engagement with the wheel and a generally radially extending portion, and an annular intermediate rigidifying annulus for said cover assembly including a portion for retainingly receiving the adjacent edges of said cover members and the radially extending portion of said retaining means, said annulus also including an outer portion arranged to overlie a portion of the outer surface of the cover assembly to rigidify the same.

2. In a cover structure for a wheel including a multi-flanged tire rim and a body part connected thereto, a wheel cover assembly comprising concentric ring and hub cap members for disposition over the wheel rim and the body part respectively and a retaining annulus including a portion extending axially for detachable engagement with the wheel and a radially extending portion, and an intermediate ring for covering the junction of said ring and hub cap members and for holding the concentric ring and hub cap members together in unitary association with the radially extending part of the retaining member.

3. As an article of manufacture, a wheel cover assembly for disposition over the outer side of a wheel to conceal the rim and body parts of the wheel radially inwardly of the tire, said cover comprising concentric circular plastic ring and hub cap members together with a retaining annulus having an axially inwardly extending portion for detachably engaging with a wheel over which the cover assembly is disposed, and means for securing said ring and hub cap members and said retaining annulus together as a unitary structure including a common relatively narrow width metal ring having portions arranged to retainingly receive the adjacent marginal parts of said cover members and said annulus and also having a portion exposed axially outwardly to provide an intermediate expanse of the cover assembly.

4. As an article of manufacture, a wheel cover assembly for disposition over the outer side of a wheel to conceal the rim and body parts of the wheel radially inwardly at the tire, said cover comprising concentric circular plastic ring and hub cap sections together with a retaining annulus having an axially inwardly extending portion for detachably engaging with a wheel over which the cover assembly is disposed, and means for securing said ring and hub cap sections and said retaining annulus together as a unitary structure including a common relatively narrow width metal ring having portions arranged to retainingly receive the adjacent marginal parts of said cover members and said annulus.

5. As an article of manufacture, a cover assembly for disposition over the outer side of a wheel including a tire rim and a body portion, said cover assembly including an outer annular cover member and a central circular hub cap simulating cover part to respectively cover the tire rim and the body portion of the wheel over which the cover assembly is disposed and a retaining annulus for securing the cover assembly detachably over the outer side of a wheel, means for securing said cover members and said retaining annulus together as a unit including a concentrically disposed annular member having an axially outer portion serving as an intermediate expanse of the cover assembly and also having a generally axially inwardly extending portion arranged to retainingly receive the adjacent peripheral parts of said cover members and said retaining annulus thereby to afford a multi-part cover assembly which is attachable to and detachable from the wheel as a unit.

6. In a wheel structure including a tire rim and a central body portion, a cover assembly including a radially outer annular cover member arranged to overlie the outer side of the tire rim, a central circular hub cap simulating cover member arranged to overlie the body portion of the wheel, and a retaining annulus for detachably securing said cover members to the wheel structure including an axially inwardly extending attachment flange and a generally radially extending cover retaining portion, means for maintaining said cover members and said retaining annulus as a unitary structure including an intermediate cover rigidifying annulus, said rigidifying annulus comprising an axially outwardly exposed, radially extending curvate, bead portion, defined on one side by a generally axially inwardly extending flange, said flange being adapted to retainingly receive the adjacent peripheral margin of one of said cover members and said curvate portion being adapted to overlie the adjacent peripheral margin of the other of said cover members, said flange being inclined radially, obliquely, to afford a cam surface arranged to retainingly receive the adjacent edge of said last named cover member and the adjacent edge of said radially extending portion of the retaining member to provide a unitary cover assembly.

7. In a wheel structure including a tire rim and a body portion, a cover assembly including a radially outer annular cover member arranged to overlie the outer side of the tire rim, a central circular hub cap simulating cover member arranged to overlie the body portion of the wheel, and a retaining annulus for detachably securing said cover members to the wheel structure including an axially inwardly extending attachment flange and a generally radially extending cover retaining portion, means for maintaining said cover members and said retaining annulus as a unitary structure including an intermediate cover rigidifying annulus, said rigidifying annulus comprising an axially outwardly exposed, radially extending curvate, bead portion, defined on one side by a generally axially inwardly extending flange, said flange being adapted to retainingly receive the adjacent peripheral margin of one of said cover members and said curvate portion being adapted to overlie the adjacent peripheral margin of the other of said cover members, said flange being inclined radially, obliquely, to afford a cam surface arranged to retainingly receive the adjacent edge of said last named cover member and the adjacent edge of said radially extending portion of the retaining member to provide a unitary cover assembly, said radially extending portion of said retaining annulus including a plurality of radially extending resilient spring fingers.

GEORGE ALBERT LYON.